(12) United States Patent
Demirors et al.

(10) Patent No.: US 9,828,495 B2
(45) Date of Patent: Nov. 28, 2017

(54) LOW HAZE POLYETHYLENE POLYMER COMPOSITIONS

(71) Applicant: Dow Global Technologies LLC, Midland, MI (US)

(72) Inventors: Mehmet Demirors, Pearland, TX (US); Mustafa Bilgen, Manvel, TX (US); Yijian Lin, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 353 days.

(21) Appl. No.: 14/576,576

(22) Filed: Dec. 19, 2014

(65) Prior Publication Data

US 2016/0177073 A1    Jun. 23, 2016

(51) Int. Cl.
*B32B 27/32* (2006.01)
*C08L 23/06* (2006.01)
*C08J 5/18* (2006.01)

(52) U.S. Cl.
CPC ............. *C08L 23/06* (2013.01); *C08J 5/18* (2013.01); *C08J 2323/06* (2013.01); *C08J 2423/06* (2013.01); *C08L 2201/10* (2013.01); *C08L 2203/16* (2013.01); *C08L 2205/025* (2013.01); *C08L 2207/062* (2013.01); *C08L 2207/066* (2013.01); *C08L 2207/068* (2013.01)

(58) Field of Classification Search
USPC .............................................. 526/352, 351
See application file for complete search history.

(56) References Cited

U.S. PATENT DOCUMENTS

| | | | |
|---|---|---|---|
| 5,576,083 A | 11/1996 | Agarwal | |
| 6,130,293 A * | 10/2000 | Hitchcock | C08J 5/18 525/191 |
| 6,395,791 B1 * | 5/2002 | Chaudhary | C08J 9/14 521/134 |
| 6,426,384 B1 | 7/2002 | Nishimura et al. | |
| 6,545,094 B2 * | 4/2003 | Oswald | C08L 23/0815 525/191 |
| 7,025,825 B2 † | 4/2006 | Pyzik | |
| 7,514,504 B2 * | 4/2009 | Van Sinoy | C08L 23/0815 525/191 |
| 7,863,386 B2 * | 1/2011 | Oswald | C08L 23/04 524/272 |
| 8,092,920 B2 | 1/2012 | Saavedra et al. | |
| 9,079,993 B1 * | 7/2015 | St. Jean | B01J 19/2415 |
| 9,505,892 B2 * | 11/2016 | Lam | C08F 210/16 |
| 2006/0057410 A1 | 3/2006 | Saavedra et al. | |
| 2013/0288032 A1 | 10/2013 | Mazzola et al. | |
| 2014/0221558 A1 | 8/2014 | Brodil et al. | |

FOREIGN PATENT DOCUMENTS

| | | |
|---|---|---|
| EP | 1275664 B1 | 2/2007 |
| WO | 0009594 A1 | 2/2000 |
| WO | 0160907 A1 | 8/2001 |
| WO | 2012166093 A1 | 12/2012 |

OTHER PUBLICATIONS

HDPE 05862N Datasheet retrieved from http://www.lookpolymers.com/pdf/Dow-HDPE-05862N-High-Density-Polyethylene.pdf.*
Yuri V. Kissin, Polyethylene End-Use Properties and their Physical Meaning, 2013, Hanser, p. 37.*
ASTM D1238-13 Standard Test Method for Melt Flow Rates of Thermoplastics by Extrusion Plastometer, ASTM International, 2013, pp. 1 and 15.*
PCT International Search Report dated Dec. 23, 2015 for PCT Application No. PCT/US2015/057137 filed Oct. 23, 2015, entitled "Low Haze Polyethylene Polymer Compositions".
Houska and Best, "Blends of mLLDPE with MMW-HDPE for Films with Improved Property Stiffness Balance", TAPPI Proceedings, Polymers, Laminations & Coatings Conference, pp. 633-638 (1997).†
Peacock, "Handbook of Polyethylene, Structures, Properties and Applications", Marcel Dekker, Inc., selected pages (8 pages total), (2000).†

* cited by examiner
† cited by third party

*Primary Examiner* — Maria Veronica Ewald
*Assistant Examiner* — Zachary Davis
(74) *Attorney, Agent, or Firm* — Dinsmore & Shohl LLP

(57) ABSTRACT

Embodiments of a polyethylene polymer blend having a melt index ($I_2$)<2 g/10 min are provided, wherein the polyethylene polymer blend comprises at least about 50% by wt. of at least one high density polyethylene resin (HDPE) having a density ≥0.950 g/cm3, a melt index ($I_2$)<4 g/10 min; a melt flow ratio ($I_{10}/I_2$)≤9, and a molecular weight distribution (MWD) of about 2 to about 5; and further comprises about 1% to about 20% by wt. of at least one low density polyethylene resin (LDPE) having a density ≤0.930 g/cm3, a melt index ($I_2$) of about 0.1 to about 10 g/min, and an MWD>3.

19 Claims, No Drawings

LOW HAZE POLYETHYLENE POLYMER COMPOSITIONS

FIELD

Embodiments of the present disclosure are generally related to polyethylene polymer blends, and are specifically related to low haze polyethylene polymer blends comprising high density polyethylene (HDPE) and low density polyethylene (LDPE).

BACKGROUND

HDPE resins are used in various industrial applications and in various articles; however, these HDPE articles have optical properties which are unsuitable for clear flexible film applications. Accordingly, there may be a continual need for HDPE articles with improved optical properties.

SUMMARY

Embodiments of the present disclosure are directed to polyethylene polymer blends which demonstrate improved optical performance, such as reduced haze. According to one embodiment, a polyethylene polymer blend is provided. The polyethylene polymer blend comprises a melt index $(I_2)<2$ g/10 min, wherein $I_2$ is measured according to ASTM D1238 at 190° C. and 2.16 kg load, wherein the polyethylene polymer blend comprises at least about 50% by wt. of at least one high density polyethylene resin (HDPE) having a density ≥0.950 g/cm$^3$, when measured according to ASTM D792, a melt index $(I_2)<4$ g/10 min, a melt flow ratio $(I_{10}/I_2)≤9$, where $I_{10}$ is measured according to ASTM D1238 at 190° C. and 10 kg load, and a molecular weight distribution (MWD) of about 2 to about 5, wherein MWD is defined as Mw/Mn with Mw being a weight average molecular weight and Mn being a number average molecular weight. The polyethylene polymer blend also comprises about 1% to about 20% by wt. of at least one low density polyethylene resin (LDPE) having a density ≤0.930 g/cm$^3$, a melt index $(I_2)$ of about 0.1 to about 10 g/min, and a MWD>3.

According to another embodiment, an article is produced from the above polyethylene polymer blends, wherein the article has a haze value ≤30% when measured according to ASTM-D-1003. In further embodiments, the article may be a blown monolayer film.

DETAILED DESCRIPTION

Embodiments of the present disclosure are directed to a polyethylene polymer blend having a melt index $(I_2)<2$ g/10 min, wherein $I_2$ is measured according to ASTM D1238 at 190° C. and 2.16 kg load.

The polyethylene polymer blend comprises at least about 50% by wt. of HDPE and at least about 1% to about 20% by wt. of LDPE. In further embodiments, the polyethylene polymer blend may comprise about 60% to about 98% by wt. HDPE, or about 70% to about 98% by wt. HDPE, or about 80% to about 98% by wt. HDPE, or about 90% to about 98% by wt. HDPE. Moreover, the polyethylene polymer blend may comprise about 1% to about 15% by wt. LDPE, or about 3% to about 15% by wt. LDPE, or about 3% to about 12% by wt. LDPE, or about 4% to about 10% by wt. LDPE.

Various density values are contemplated for the polyethylene polymer blend based on the amounts of the HDPE and LDPE used in the blend. In one more embodiments, the density of the polyethylene polymer blend is about 0.940 g/cm$^3$, or at least about 0.950 g/cm$^3$, or at least about 0.955 g/cm$^3$. Moreover, the density may range from about 0.940 g/cm$^3$ to 0.970 g/cm$^3$, or about 0.950 g/cm$^3$ to about 0.965 g/cm$^3$, or about 0.950 g/cm$^3$ to about 0.960 g/cm$^3$. Density is measured in accordance with ASTM D 792.

The polyethylene polymer blend may have various properties which make it suitable for processing into a blown film. In one embodiment, the polyethylene polymer blend may have a molecular weight distribution (MWD) of about 2.5 to about 5, wherein MWD is defined as Mw/Mn with Mw being a weight average molecular weight and Mn being a number average molecular weight measured by GPC. In further embodiments, the MWD is from about or about 2 to about 4.5, or about 3 to about 5, or about 3.5 to about 4, or about 2.5 to about 4, or about 3 to about 4.

As stated above, the melt index $(I_2)$ for the polyethylene polymer blend is less than 2 g/10 min. Moreover, in further embodiments, the melt index $(I_2)$ of the polyethylene polymer blend is about 0.5 to about 1.5 g/10 min, or about 0.7 to about 1.2 g/10 min.

Further, the melt flow ratio $(I_{10}/I_2)$ of the polyethylene polymer blend, where $I_{10}$ is measured according to ASTM D1238 at 190° C. and 10 kg load of the polyethylene polymer blend ≤9, or ≤8.5, or less than ≤8. Moreover, Moreover, the melt flow ratio $(I_{10}/I_2)$ may range from about 6 to about 9, or about 6.5 to about 8.5, or about 7 to about 8.

High Density Polyethylene (HDPE)

The HDPE may have a density ≥0.950 g/cm$^3$. In further embodiments, the density of the HDPE may be from about 0.955 to about 0.975 g/cm$^3$, or about 0.955 to about 0.970 g/cm$^3$, or about 0.955 to about 0.965 g/cm$^3$, or about 0.960 to about 0.970 g/cm$^3$ The HDPE may also have a melt index $(I_2)$ less than 4 g/10 min, or less than 3 g/10 min, or less than 2 g/10 min. In additional embodiments, the melt index $(I_2)$ of the HDPE is from about 0.1 to about 2.5 g/10 min, or from about 0.1 to 2.0 g/10 min, or about 0.5 to about 2 g/10 min, or about 0.2 to about 1.5 mg/10 min, or about 0.5 to about 1.5 g/10 min.

The HDPE may have a melt flow ratio $(I_{10}/I_2)≤9$, where $I_{10}$ is measured according to ASTM D1238 at 190° C. and 10 kg load polymer blend, or ≤8.5, or less than ≤8. Moreover, the melt flow ratio $(I_{10}/I_2)$ may range from about 6 to about 9, or about 6 to about 8.5, or about 6 about 8, or about 7 to about 8.

Further, the HDPE may have a molecular weight distribution (MWD) about 2 to about 5, or about 2.5 to about 4.5, or about 3 to about 5, or about 3.5 to about 4, or about 2.5 to about 4, or about 3 to about 4.

These HDPE polymers may be produced via various processes familiar to one of ordinary skill in the art, for example, Ziegler-Natta catalyzed polymerization processes. Moreover, it is suitable to produce the present HDPE examples in a single reactor or multiple reactors. While HDPE Examples 1-3 in the tables below are produced in a single reactor, it is contemplated to use multiple reactors for various reasons e.g., reducing the time required to achieve the HDPE resin.

Low Density Polyethylene (LDPE)

The LDPE may have a density ≤0.930 g/cm$^3$, or about 0.915 to 0.930 g/cm$^3$. The LDPE may have a melt index $(I_2)$ less than 10 g/10 min, or less than 5 g/10 min, or less than 2 g/10 min. Stated differently, the LDPE may have a melt index $(I_2)$ of about 0.1 to about 10 g/min, or about 0.5 to about 10 g/10 min, or about 0.5 to about 8 g/10 min, or about 1 to about 8 g/10 min, or about 2 to about 7 g/10 min. The LDPE may have an MWD value of at least 3, or about 3.5 to about 10, or about 4 to about 10, or about 5 to about 9.

Various compositional embodiments are suitable as LDPEs. Such LDPEs may be commercially available under the tradenames AGILITY™ (e.g., AGILITY 1000, AGILITY 1001, and AGILITY 1021), DOW™ LDPE 6401, DOW™ LDPE 6211, and DOW™ LDPE 7511, all of which are available from The Dow Chemical Company (Midland, Mich.)

Additional optional materials may be added to the polyethylene polymer blend of the present disclosure. For example, these materials may include nucleating agents, antioxidants, antibacterial agents, ultraviolet absorbers, light stabilizers, neutralizers, antistatic agents, antiblocking agents, flame retardants, lubricants, various other processing aids and fillers, and the like and mixtures thereof. In embodiments including nucleating agents, the polyethylene polymer blend may comprise about 100 to about 2000 ppm of nucleating agent, or about 500 to about 1000 ppm of nucleating agent.

The polyethylene polymer blends may be utilized in the fabrication of various articles. For example and not by way of limitation, the article may be a blown monolayer film. Various thicknesses are contemplated for the blown monolayer film. For example, the blown monolayer film may have a thickness of about 0.1 mil to about 5 mils, or about 0.5 mils to about 2 mils, or about 0.5 to about 1.5 mils, or about 0.8 to about 1.2 mils.

The articles of the present disclosure, which may be a blown monolayer film or another suitable structure, demonstrate suitable optical properties. For example, the article may demonstrate a total haze ≤30%, or a total haze value ≤25%, or a or a total haze value ≤20%, or a total haze value ≤15%, or a total haze value ≤10% when measured according to ASTM-D-1003. In a specific embodiment, a blown monolayer film having a thickness of about 0.5 to about 1.5 mils demonstrates a haze value ≤25%, or a haze value ≤20%.

In addition to optical results, the strength of the blown monolayer film or article may be characterized one or more of the following metrics. One such metric is secant modulus. In specific embodiments, the article may have a 2% secant modulus greater than 90,000 psi in the machine direction in accordance with ASTM D882-12, or a 2% secant modulus greater than 100,000 psi. Additionally, lower tear strength may be also be desired for the present articles, specifically in plastic wrap materials. In one embodiment, the article may have a tear strength of less than 35 g in the machine direction in accordance with ASTM D882-12, or less than 30 g in the machine direction.

Testing Methods

Density

Samples for density measurement are prepared according to ASTM D1928. Measurements are made using ASTM D792, Method B.

Melt Index

Melt index, or $I_2$, is determined according to ASTM D1238 at 190° C., 2.16 kg. Melt index, or $I_{10}$, is measured in accordance with ASTM D1238 at 190° C., 10 kg.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4-trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.4316\times(M_{polystyrene})$. Polyethylene equivalent molecular weight calculations are performed using Viscotek TriSEC software Version 3.0.

Number- and weight-average molecular weights were calculated according to the following equations:

$$M_n = \frac{\sum_i Wf_i}{\sum_i (Wf_i / M_i)}$$

$$M_w = \frac{\sum_i (Wf_i * M_i)}{\sum_i Wf_i}$$

wherein Mn is the number average molecular weight, Mw, is the weight average molecular weight, and $Wf_i$ is the weight fraction of the molecules with a molecular weight of $M_i$.

Tensile Properties

Tensile break stress, tensile break strain, and 2% secant modulus are measured in the machine direction (MD) and cross direction (CD) with an Instron universal tester according to ASTM D882-12. Five specimens for each material are tested and average numbers are reported.

Optical Properties

Film gloss at 45° is determined using ASTM D2457. Total haze of the films is measured according to ASTM D1003. Clarity of the films is done according to ASTM D1746.

EXAMPLES

The following discusses the production of exemplary polyethylene polymer blend and methods of making these polyethylene polymer blends. Additionally, the following discussion discloses methods of producing films from the polyethylene polymer blends. In addition to the procedures, the properties of the polyethylene polymer blends and films produced therefrom are also provided below.

Resin Fabrication

The polyethylene resins are produced via a solution polymerization according to the following exemplary process. All raw materials (monomer and comonomer) and the process solvent (a narrow boiling range high-purity isoparaffinic solvent trademarked Isopar E and commercially available from Exxon Mobil Corporation) are purified with molecular sieves before introduction into the reaction environment. Hydrogen is supplied in pressurized cylinders as a high purity grade and is not further purified. The reactor monomer feed stream is pressurized via a mechanical compressor to above reaction pressure. The solvent and comonomer feed is pressurized via a mechanical positive displacement pump to above reaction pressure. The individual catalyst components are manually batch diluted to specified component concentrations with purified solvent (Isopar E) and pressured to above reaction pressure. All reaction feed flows are measured with mass flow meters and independently controlled with computer automated valve control systems.

The fresh comonomer feed is mechanically pressurized and can be injected into the process at several potential locations depending on reactor configuration which include: only the feed stream for the first reactor, only the feed stream for the second reactor, both the first and second reactor feed streams independently, or into a common stream prior to the solvent split to the two reactors. Some comonomer injection combinations are only possible when running dual reactor configuration.

Reactor configuration options include single reactor operation, dual series reactor operation, or dual parallel reactor operation.

The continuous solution polymerization reactor consists of a liquid full, non-adiabatic, isothermal, circulating, loop reactor. Independent control of all fresh solvent, monomer, comonomer, hydrogen, and catalyst component feeds is possible. The total fresh feed stream to the reactor (solvent, monomer, comonomer, and hydrogen) is temperature controlled by passing the feed stream through a heat exchanger. The total fresh feed to the polymerization reactor is injected into the reactor at two locations with approximately equal reactor volumes between each injection location. The fresh feed is controlled with each injector receiving half of the total fresh feed mass flow. The catalyst components are injected into the polymerization reactor through a specially designed injection stinger and are combined into one mixed catalyst/cocatalyst feed stream prior to injection into the reactor. The primary catalyst component feed is computer controlled to maintain the reactor monomer concentration at a specified target. The cocatalyst component(s) is/are fed based on calculated specified molar ratios to the primary catalyst component. Immediately following each fresh injection location (either feed or catalyst), the feed streams are mixed with the circulating polymerization reactor contents with static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a positive displacement pump.

In dual series reactor configuration the effluent from the first polymerization reactor (containing solvent, monomer, comonomer, hydrogen, catalyst components, and molten polymer) exits the first reactor loop and is added to the second reactor loop downstream of the second reactor lower pressure fresh feed injection.

In dual parallel reactor configuration the effluent streams from the first and the second polymerization reactors are combined prior to any additional processing.

In all reactor configurations the final reactor effluent (second reactor effluent for dual series, the combined effluent for dual parallel, or the single reactor effluent) enters a zone where it is deactivated with the addition of and reaction with water. At this same reactor exit location other additives may also be added (such as an acid scavenging agent and anti-oxidants. The stream then goes through a static mixer to disperse the post reactor additive components.

Following catalyst deactivation and additive addition, the reactor effluent passes through a heat exchanger to raise the stream temperature in preparation for separation of the polymer from the other lower boiling reaction components. The stream then passes through a pressure let down control valve (responsible for maintaining the pressure of the reactor at a specified target). The stream then enters a two stage separation and devolatization system where the polymer is removed from the solvent, hydrogen, and unreacted monomer and comonomer. The recycled stream is purified before entering the reactor again. The separated and devolatilized polymer melt is pumped through a die specially designed for underwater pelletization, cut into uniform solid pellets, dried, and transferred into a hopper. After validation of initial polymer properties, the solid polymer pellets are manually dumped into a box for storage. Each box typically holds 1200 pounds of polymer pellets.

The non-polymer portions removed in the devolatilization step pass through various pieces of equipment which separate most of the ethylene which is removed from the system to a vent destruction unit. Most of the solvent and unreacted comonomer is recycled back to the reactor after passing through molecular sieve purification beds, a small amount of solvent is purged from the process as co-product.

TABLE 1

Processing Parameters for Exemplary HDPE Polymers

| | Units | Example 1 | Example 2 | Example 3 |
|---|---|---|---|---|
| 1. REACTOR FEEDS | | | | |
| Reactor Feed Temperature | deg C. | 54 | 55 | 54 |
| Reactor Total Solvent Flow | lbs/h | 1481 | 1457 | 1739 |
| Reactor Fresh Ethylene Flow | lbs/h | 385 | 378 | 422 |
| Reactor Total Ethylene Flow | lbs/h | 396 | 389 | 436 |
| Comonomer Type Used | | None | None | None |

TABLE 1-continued

Processing Parameters for Exemplary HDPE Polymers

| | Units | Example 1 | Example 2 | Example 3 |
|---|---|---|---|---|
| Reactor Fresh Comonomer Flow | lbs/h | 0.0 | 0.0 | 0.0 |
| Reactor Total Comonomer Flow | lbs/h | 0.0 | 0.0 | 0.0 |
| Reactor Comonomer/Olefin Ratio | % | 0.0 | 0.0 | 0.0 |
| Reactor Feed Solvent/Ethylene Ratio | Ratio | 3.84 | 3.85 | 4.12 |
| Reactor Fresh Hydrogen Flow | sccm | 4551 | 2874 | 7914 |
| Reactor Hydrogen Mole Percent | mol % | 0.18 | 0.11 | 0.30 |
| 2. REACTION | | | | |
| Reactor Configuration | | Single reactor | Single reactor | Single reactor |
| Reactor Control Temperature | deg C. | 195 | 208 | 185 |
| Reactor Pressure | psig | 725 | 725 | 725 |
| Reactor Ethylene Conversion | % | 92.9 | 92.8 | 92.3 |
| Reactor FTnIR Exit C2 Concentration | g/L | 9.0 | 9.0 | 9.4 |
| Reactor Viscosity | centi-Poise | 1447 | 1147 | 1225 |
| Reactor Polymer Residence Time | hrs | 0.11 | 0.10 | 0.09 |
| 3. CATALYST | | | | |
| Reactor Catalyst Type | | ZN-CAT | ZN-CAT | ZN-CAT |
| Reactor Catalyst Efficiency | $10^6$ lbs polymer/lb Ti | 0.72 | 0.53 | 0.68 |
| Reactor Co-Catalyst Molar Ratio | Ratio | 4.0 | 4.0 | 4.0 |
| Reactor Co-Catalyst Type | | triethylaluminum (TEA) | triethylaluminum (TEA) | triethylaluminum (TEA) |

TABLE 2

Processing Parameters for Comparative HDPE Polymers

| | Units | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| 1. REACTOR FEEDS | | | | | | | |
| Primary Reactor Feed Temperature | °C. | 40 | 40 | 40 | 40 | 60 | 60 |
| Primary Reactor Total Solvent Flow | lbs/h | 1266 | 1346 | 1424 | 979 | 1143 | 1746 |
| Primary Reactor Fresh Ethylene Flow | lbs/h | 221 | 236 | 251 | 208 | 154 | 238 |
| Primary Reactor Total Ethylene Flow | lbs/h | 231 | 248 | 262 | 216 | 163 | 251 |
| Comonomer Type Used | | 1-Octene | None | None | None | None | None |
| Primary Reactor Fresh Comonomer Flow | lbs/h | 0.98 | 0.00 | 0.00 | 0.00 | 0.00 | 0.00 |
| Primary Reactor Total Comonomer Flow | lbs/h | 1.95 | 0.00 | 0.00 | 0.00 | 0.00 | 0.00 |
| Primary Reactor Feed Solvent/Ethylene Ratio | Ratio | 5.73 | 5.68 | 5.68 | 4.71 | 7.42 | 7.33 |

TABLE 2-continued

Processing Parameters for Comparative HDPE Polymers

|  | Units | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Primary Reactor Fresh Hydrogen Flow | sccm | 4185 | 4965 | 4691 | 7325 | 691 | 2500 |
| Primary Reactor Hydrogen Mole Percent | mol % | 0.28 | 0.31 | 0.27 | 0.52 | 0.06 | 0.15 |
| Secondary Reactor Feed Temperature | °C. | 40 | 40 | 40 | 40 | 40 | 39 |
| Secondary Reactor Total Solvent Flow | lbs/h | 526 | 560 | 592 | 604 | 700 | 486 |
| Secondary Reactor Fresh Ethylene Flow | lbs/h | 199 | 212 | 225 | 226 | 263 | 184 |
| Secondary Reactor Total Ethylene Flow | lbs/h | 203 | 216 | 229 | 232 | 269 | 187 |
| Secondary Reactor Fresh Comonomer Flow | lbs/h | 0.0 | 0.0 | 0.0 | 0.0 | 0.0 | 0.0 |
| Secondary Reactor Total Comonomer Flow | lbs/h | 0.40 | 0.0 | 0.0 | 0.0 | 0.0 | 0.0 |
| Secondary Reactor Feed Solvent/Ethylene Ratio | Ratio | 2.64 | 2.65 | 2.63 | 2.66 | 2.65 | 2.65 |
| Secondary Reactor Fresh Hydrogen Flow | sccm | 16603 | 19122 | 16985 | 100 | 36643 | 49678 |
| Secondary Reactor Hydrogen Mole Percent | mol % | 1.25 | 1.34 | 1.12 | 0.007 | 2.05 | 3.90 |
| Overall Comonomer/Olefin Ratio | Ratio | 0.53 | 0.0 | 0.0 | 0.0 | 0.0 | 0.0 |
| 2. REACTION |  |  |  |  |  |  |  |
| Reactor Configuration |  | Dual Series | Dual Series | Dual Series | Dual Series | Dual Series | Dual Series |
| Primary Reactor Control Temperature | °C. | 170 | 170 | 170 | 160 | 159 | 160 |
| Primary Reactor Pressure | psig | 725 | 725 | 725 | 725 | 725 | 725 |
| Primary Reactor Ethylene Conversion | % | 80.3 | 80.4 | 80.5 | 85.1 | 74.5 | 74.5 |
| Primary Reactor FTnIR Exit Ethylene Concentration | g/L | 18.5 | 18.4 | 18.4 | 16.7 | 19.6 | 19.4 |
| Primary Reactor Viscosity | centiPoise | 1710 | 1288 | 830 | 477 | 3560 | 960 |
| Primary Reactor Polymer Residence Time | hrs | 0.23 | 0.21 | 0.20 | 0.29 | 0.26 | 0.17 |
| Secondary Reactor Control Temperature | °C. | 195 | 195 | 195 | 190 | 195 | 195 |
| Secondary Reactor Pressure | psig | 726 | 727 | 726 | 729 | 730 | 724 |
| Secondary Reactor Ethylene Conversion | % | 87.2 | 87.0 | 87.0 | 82.1 | 90.0 | 86.1 |
| Secondary Reactor FTnIR Exit Ethylene Concentration | g/L | 8.6 | 8.7 | 8.7 | 14.0 | 8.2 | 7.8 |
| Secondary Reactor Viscosity | centiPoise | 422 | 334 | 248 | 822 | 359 | 168 |
| Secondary Reactor Polymer Residence Time | hrs | 0.09 | 0.08 | 0.08 | 0.10 | 0.09 | 0.07 |

TABLE 2-continued

Processing Parameters for Comparative HDPE Polymers

| | Units | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Overall Ethylene Conversion by vent | % | 92.9 | 92.6 | 92.5 | 89.6 | 92.8 | 92.0 |
| 3. CATALYST | | | | | | | |
| Primary Reactor Catalyst Type | | m-CAT | m-CAT | m-CAT | m-CAT | m-CAT | m-CAT |
| Primary Reactor Catalyst Efficiency | $10^6$ lbs polymer/lb Zr | 3.77 | 3.17 | 2.88 | 2.99 | 1.94 | 1.93 |
| Primary Reactor Co-Catalyst-1 Molar Ratio | Ratio | 2.48 | 2.54 | 2.33 | 2.49 | 2.50 | 2.48 |
| Primary Reactor Co-Catalyst-1 Type | | RIBS-2 | RIBS-2 | RIBS-2 | RIBS-2 | RIBS-2 | RIBS-2 |
| Primary Reactor Co-Catalyst-2 Molar Ratio | Ratio | 10.0 | 10.0 | 10.0 | 10.0 | 10.0 | 10.0 |
| Primary Reactor Co-Catalyst-2 Type | | MMAO-3A | MMAO-3A | MMAO-3A | MMAO-3A | MMAO-3A | MMAO-3A |
| Secondary Reactor Catalyst Type | | m-CAT | m-CAT | m-CAT | m-CAT | m-CAT | m-CAT |
| Secondary Reactor Catalyst Efficiency | $10^6$ lbs polymer/lb Zr | 0.88 | 1.14 | 1.14 | 2.37 | 0.99 | 0.94 |
| Secondary Reactor Co-Catalyst-1 Molar Ratio | Ratio | 1.5 | 1.5 | 1.5 | 1.5 | 1.5 | 1.5 |
| Secondary Reactor Co-Catalyst-1 Type | | RIBS-2 | RIBS-2 | RIBS-2 | RIBS-2 | RIBS-2 | RIBS-2 |
| Secondary Reactor Co-Catalyst-2 Molar Ratio | Ratio | 3.0 | 3.0 | 3.0 | 3.0 | 3.0 | 3.0 |
| Secondary Reactor Co-Catalyst-2 Type | | MMAO-3A | MMAO-3A | MMAO-3A | MMAO-3A | MMAO-3A | MMAO-3A |

TABLE 3

Catalyst from Tables 1 and 2

| | (CAS name) |
|---|---|
| m-CAT | Zirconium, [2,2'''-[I,3-propanediylbis(oxy-ϰO)]bis[3'',5,5''-tris(1,1-dimethylethyl)-5'-methyl[1,1':3',1''-terphenyl]-2'-olato-ϰO]]dimethyl-, (OC-6-33)- |
| RIBS-2 | Amines, bis(hydrogenated tallow alkyl)methyl, tetrakis(pentafluorophenyl)borate(1-) |
| MMAO-3A | Aluminoxanes, iso-Bu Me, branched, cyclic and linear; modified methyl 3A aluminoxane |

TABLE 4

Properties of HDPE Resins and HDPE/LDPE melt blend

| Composition | $I_2$ (g/min) | $I_{10}/I_2$ | Mw/Mn | Density (g/cc) | Note |
|---|---|---|---|---|---|
| Comp. Ex. 1 | 0.91 | 11 | 4.8 | 0.955 | Dual reactor |
| Comp. Ex. 2 | 1.2 | 10.2 | 4.0 | 0.9601 | Dual reactor |
| Comp. Ex. 3 | 1.89 | 9.6 | 3.6 | 0.9603 | Dual reactor |
| Comp. Ex. 4 | 0.83 | 8.9 | 2.0 | 0.9543 | Dual reactor |
| Comp. Ex. 5 | 0.76 | 31.9 | 11.3 | 0.9708 | Dual reactor |
| Comp. Ex. 6 | 0.8 | 12.4 | 20.0 | 0.9679 | Dual reactor |
| ELITE 5960G | 0.85 | 11.0 | 5.1 | 0.9615 | Dual reactor |
| Ex. 1 | 1.0 | 7.5 | 3.6 | 0.9591 | Single reactor |
| Ex. 2 | 1.0 | 7.7 | 4.0 | 0.9593 | Single reactor |
| Ex. 3 | 1.0 | 7.0 | 3.6 | 0.9587 | Single reactor |
| 97 wt % Example 3/3% AGILITY 1021 melt blend | 1.0 | 7.0 | 3.6 | 0.9579 | Blend |

The ZN-CAT was prepared according to the following procedure. Ethylaluminium dichloride (EADC) solution (15 wt % EADC dissolved in Isopar E) was transferred into the stirred vessel containing magnesium chloride ($MgCl_2$) slurry (0.2M in Isopar E) and let to age while stirring for 6 hours prior to use. Titanium tetraisopropoxide ($Ti(OiPr)_4$) was transferred to the $MgCl_2$/EADC slurry vessel, followed by at least 8 hours of aging to obtain the procatalyst. The ratio of $MgCl_2$:EADC:$Ti(OiPr)_4$ was such that the metal ratio (Mg:Al:Ti) in the procatalyst 1 was 40:12.5:3.

TABLE 5

Properties of the LDPE resins

|  | Mw/Mn | $I_2$ (g/10 min) | Density (g/cc) |
|---|---|---|---|
| DOW LDPE 640I | 4.8 | 2 | 0.9200 |
| DOW AGILITY 1021 | 6.4 | 1.85 | 0.9195 |
| LDPE 621I | 9.3 | 2.3 | 0.9180 |
| DOW AGILITY 1000 | 7.5 | 0.19 | 0.9195 |
| DOW AGILITY 1001 | 6.1 | 0.65 | 0.9200 |
| DOW LDPE 751A1 | 7.2 | 6.4 | 0.9250 |

Film Fabrication

As shown in Tables 6-8 below, 1-mil monolayer films were fabricated from the HDPE resins and the LDPE resins above using a blown film line. The HDPE and LDPE were dry blended in the amounts listed below. The dry blend was dropped in to the hopper of the extruder for making the blown film. The blown film line was equipped with an annular die with a diameter of 8 inch and a die gap of 70 mils. Blow up ratio (BUR) is 2.5:1 and frost line height (FLH) is 40 inch. Output rate is 260 lbs/h. The melt temperature is 440° F.

In addition to the dry blended films of Tables 6-8 below, Tables 4 and 6 also list a melt blend produced from 97% by wt of Example 3 HDPE and 3% by wt. AGILITY 1021 LDPE. This process was performed on the Farrel CP 250 continuous mixer; with a horsepower rating of 40 hp on the extruder and 60 hp on the mixer. The mixer was equipped with the 2.88 inch, 7/15 rotor combination with two dams at the 5 and 6 positions and no vent. Nitrogen was fed to the mixer feed throat at 5 SCFH. Material was melted and compounded in the mixer. The residence time was controlled by a feed rate of 200 pounds per hour, orifice opening of 50%, and mixer screw speed of 450 RPM. Maximum RPM of the mixer is 850. Once mixed, the compounded ribbon was then fed into the 4 inch 11/1 L/D single screw extruder to be extruded into strands at 28 RPM. Maximum RPM of the extruder is 100. The pusher was not used. An eight-hole strand die with 4.0 mm diameter holes was utilized. The strands were run through about half of a 16 foot water bath as a single pass, then passed through a Berlyn Air Knife to remove excess water. Then the strands were chopped into pellets via a Scheer pelletizer. The chopped pellets were passed over a classifier which culled out fines and longs and then discharged into a 15 gallon plastic drum. The pellets were transferred to a hopper via a vacuum loading system then dropped into lined cartons. The cartons were purged at least two days with nitrogen.

TABLE 6

Properties of the films

| | Clarity | Gloss | Haze | 2% Secant Modulus, CD | 2% Secant Modulus, MD | Tear, CD | Tear, MD |
|---|---|---|---|---|---|---|---|
| Unit | % | % | % | psi | psi | gram | Gram |
| ELITE 5960G | 75 | 11 | 54 | 129,159 | 110,736 | 351 | 12 |
| 90 wt % ELITE 5960G/10 wt % AGILITY 1021 | 85 | 17 | 39 | 116,455 | 98,323 | 676 | 13 |
| 90 wt % Comp. Ex. 1/ 10 wt % AGILITY 1021 | 95 | 20 | 34 | 119,704 | 95,946 | 1092 | 11 |
| 90 wt % Comp. Ex. 2/ 10 wt % AGILITY 1021 | 93 | 18 | 41 | 136,361 | 108,796 | 791 | 12 |
| 90 wt % Comp. Ex. 3/ 10 wt % AGILITY 1021 | 87 | 13 | 52 | 136,606 | 105,365 | 278 | 12 |
| Comp. Ex. 4 | 24 | 7 | 83 | 109,721 | 95,699 | 214 | 24 |
| 90 wt % Comp. Ex. 4/ 10 wt % AGILITY 1021 | 96 | 25 | 35 | 118,235 | 92,983 | 351 | 17 |
| Comp. Ex. 5 | 57 | 6 | 79 | 103,983 | 104,844 | 372 | 15 |
| 90 wt % Comp. Ex. 1/ 10 wt % AGILITY 1021 | 82 | 13 | 46 | 100,977 | 92,578 | 161 | 12 |
| Ex. 1 | 92 | 20 | 35 | 153,903 | 109,298 | 251 | 21 |
| 90 wt % Ex. 1/10 wt % AGILITY 1021 | 98 | 44 | 17 | 127,945 | 103,259 | 396 | 14 |

| | Tensile Break Stress, CD | Tensile Break Strain, CD | Tensile Yield Stress, CD | Tensile Break Stress, MD | Tensile Break Strain, MD | Tensile Yield Stress, MD |
|---|---|---|---|---|---|---|
| Unit | psi | % | psi | psi | % | Psi |
| ELITE 5960G | 3,086 | 384 | 3,856 | 4,924 | 532 | 3,625 |
| 90 wt % ELITE 5960G/10 wt % AGILITY 1021 | 2,680 | 556 | 4,162 | 4,372 | 517 | 3,307 |
| 90 wt % Comp. Ex. 1/ 10 wt % AGILITY 1021 | 2,362 | 354 | 3,567 | 2,641 | 531 | 3,829 |
| 90 wt % Comp. Ex. 2/ 10 wt % AGILITY 1021 | 2,582 | 369 | 3,853 | 4,795 | 523 | 3,908 |
| 90 wt % Comp. Ex. 3/ 10 wt % AGILITY 1021 | 2,389 | 355 | 3,628 | 2,077 | 390 | 3,792 |

TABLE 6-continued

| Properties of the films | | | | | | |
|---|---|---|---|---|---|---|
| Comp. Ex. 4 | 4,946 | 788 | 3,791 | 6,049 | 635 | 3,651 |
| 90 wt % Comp. Ex. 4/ 10 wt % AGILITY 1021 | 3,094 | 467 | 4,026 | 5,812 | 661 | 3,620 |
| Comp. Ex. 5 | 1,027 | 63 | 1,657 | 1,462 | 249 | 1,557 |
| 90 wt % Comp. Ex. 1/ 10 wt % AGILITY 1021 | 1,066 | 3 | 1,066 | 1,246 | 248 | 1,598 |
| Ex. 1 | 3,929 | 656 | 4,292 | 5,309 | 556 | 3,909 |
| 90 wt % Ex. 1/10 wt % AGILITY 1021 | 3,069 | 515 | 3,939 | 5,064 | 592 | 3,628 |

The following tables depict the effect of increasing LDPE amounts for the present exemplary polyethylene polymer blends.

TABLE 7

Ex. 1 HDPE polyethylene polymer blends

| | Clarity | Gloss | Haze | 2% Secant Modulus, CD | 2% Secant Modulus, MD | Tear, CD | Tear, MD |
|---|---|---|---|---|---|---|---|
| Unit | % | % | % | psi | psi | Gram | Gram |
| 90 wt % Ex. 1/10 wt % AGILITY 1021 | 98 | 45 | 18 | 133,662 | 107,281 | 427 | 18 |
| 98 wt % Ex. 1/2 wt % AGILITY 1021 | 96 | 28 | 28 | 151,620 | 122,729 | 211 | 21 |
| 96 wt % Ex. 1/4 wt % AGILITY 1021 | 96 | 33 | 26 | 137,786 | 114,585 | 261 | 20 |
| 94 % wt Ex. 1/6 wt % AGILITY 1021 | 97 | 33 | 24 | 145,766 | 119,691 | 341 | 18 |
| 97 wt % Ex. 3/3 wt % AGILITY 1021 melt blend | 97 | 36 | 23 | 120,343 | 103,027 | 266 | 21 |

| | Tensile Break Stress, CD | Tensile Break Strain, CD | Tensile Yield Stress, CD | Tensile Break Stress, MD | Tensile Break Strain, MD | Tensile Yield Stress, MD |
|---|---|---|---|---|---|---|
| Unit | psi | % | psi | Ppsi | % | Psi |
| 90 wt % Ex. 1/10 wt % AGILITY 1021 | 3,493 | 541 | 4,046 | 4,932 | 562 | 3,774 |
| 98 wt % Ex. 1/2 wt % AGILITY 1021 | 4,640 | 736 | 4,343 | 5,499 | 616 | 3,864 |
| 96 wt % Ex. 1/4 wt % AGILITY 1021 | 4,577 | 727 | 4,254 | 5,774 | 646 | 3,863 |
| 94 % wt Ex. 1/6 wt % AGILITY 1021 | 4,549 | 705 | 4,246 | 5,328 | 624 | 3,778 |
| 97 wt % Ex. 3/3 wt % AGILITY 1021 melt blend | 4,163 | 687 | 3,907 | 4,472 | 580 | 3,769 |

TABLE 8

Ex. 2 HDPE polyethylene polymer blends

| | Clarity | Gloss | Haze | 2% Secant Modulus, CD | 2% Secant Modulus, MD | Tear, CD | Tear, MD |
|---|---|---|---|---|---|---|---|
| Unit | % | % | % | psi | psi | gram | gram |
| Ex. 2 | 95 | 28 | 27 | 154,162 | 128,855 | 258 | 23 |
| 97 wt % Ex. 2/3 wt % LDPE 640I | 96 | 32 | 25 | 29,625 | 114,631 | 287 | 21 |
| 90 wt % Ex. 2/10 wt % LDPE 640I | 98 | 40 | 20 | 128,362 | 104,178 | 355 | 18 |
| 97 wt % Ex. 2/3 wt % AGILITY 1021 | 96 | 32 | 25 | 142,800 | 106,760 | 350 | 18 |
| 90 wt % Ex. 2/10 wt % AGILITY 1021 | 97 | 41 | 19 | 126,993 | 105,458 | 411 | 14 |
| 90 wt % Ex. 2/10 wt % LDPE 621I | 97 | 37 | 23 | 128,593 | 110,660 | 319 | 17 |

TABLE 8-continued

Ex. 2 HDPE polyethylene polymer blends

|  | Clarity | Gloss | Haze | 2% Secant Modulus, CD | 2% Secant Modulus, MD | Tear, CD | Tear, MD |
|---|---|---|---|---|---|---|---|
| 97 wt % Ex. 2/3 wt % AGILITY 1000 | 95 | 34 | 25 | 147,512 | 111,397 | 277 | 21 |
| 90 wt % Ex. 2/10 wt % AGILITY 1000 | 97 | 39 | 18 | 131,056 | 109,028 | 456 | 15 |
| 90 wt % Ex. 2/10 wt % AGILITY 1001 | 97 | 37 | 22 | 138,325 | 106,403 | 420 | 16 |
| 90 wt % Ex. 2/10 wt % LDPE 751A1 | 96 | 36 | 23 | 134,211 | 107,163 | 381 | 17 |

|  | Tensile Break Stress, CD | Tensile Break Strain, CD | Tensile Yield Stress, CD | Tensile Break Stress, MD | Tensile Break Strain, MD | Tensile Yield Stress, MD |
|---|---|---|---|---|---|---|
| Unit | psi | % | Psi | psi | % | psi |
| Ex. 2 | 4,066 | 632 | 4,395 | 3,941 | 513 | 3,996 |
| 97 wt % Ex. 2/3 wt % LDPE 640I | 3,703 | 548 | 4,261 | 5,550 | 663 | 3,897 |
| 90 wt % Ex. 2/10 wt % LDPE 640I | 3,320 | 669 | 4,317 | 5,182 | 659 | 3,716 |
| 97 wt % Ex. 2/3 wt % AGILITY 1021 | 3,456 | 555 | 4,458 | 5,858 | 677 | 3,971 |
| 90 wt % Ex. 2/10 wt % AGILITY 1021 | 3,015 | 552 | 4,135 | 4,918 | 619 | 3,833 |
| 90 wt % Ex. 2/10 wt % LDPE 621I | 3,163 | 555 | 3,970 | 4,774 | 692 | 3,767 |
| 97 wt % Ex. 2/3 wt % AGILITY 1000 | 4,184 | 648 | 4,465 | 3,383 | 317 | 3,894 |
| 90 wt % Ex. 2/10 wt % AGILITY 1000 | 3,354 | 591 | 4,217 | 5,179 | 643 | 3,914 |
| 90 wt % Ex. 2/10 wt % AGILITY 1001 | 3,366 | 606 | 4,135 | 5,535 | 684 | 3,854 |
| 90 wt % Ex. 2/10 wt % LDPE 751A1 | 3,365 | 616 | 3,843 | 5,323 | 728 | 3,717 |

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A polyethylene polymer blend having a melt index ($I_2$)<2 g/10 min, wherein $I_2$ is measured according to ASTM D1238 at 190° C. and 2.16 kg load, wherein the polyethylene polymer blend comprises:
   at least about 50% by wt. of at least one high density polyethylene resin (HDPE) having
      a density ≥0.950 g/cm³, when measured according to ASTM D792;
      a melt index ($I_2$)<4 g/10 min;
      a melt flow ratio ($I_{10}/I_2$)≤9, where $I_{10}$ is measured according to ASTM D1238 at 190° C. and 10 kg load; and
      a molecular weight distribution (MWD) of about 2.0 to about 5, wherein MWD is defined as Mw/Mn with Mw being a weight average molecular weight and Mn being a number average molecular weight; and
   about 1% to about 20% by wt. of at least one low density polyethylene resin (LDPE) having a density ≤0.930 g/cm³, a melt index ($I_2$) of about 0.1 to about 10 g/min, and a MWD>3.

2. The polyethylene polymer blend of claim 1 wherein the polyethylene polymer blend comprises about 2% to about 15% by wt. LDPE.

3. The polyethylene polymer blend of claim 1 wherein the polyethylene polymer blend comprises about 60% to about 98% by wt. HDPE.

4. The polyethylene polymer blend of claim 1 wherein the density of the polyethylene polymer blend ≥0.950 g/cm³ and the melt flow ratio ($I_{10}/I_2$) of the polyethylene polymer blend ≤9.

5. The polyethylene polymer blend of claim 1 wherein the melt index ($I_2$) of the polyethylene polymer blend is from about 0.5 to about 1.5 g/10 min.

6. The polyethylene polymer blend of claim 1 wherein the density of the HDPE is from about 0.955 to about 0.970 g/cm³ and the MWD of the HDPE is from about 2.5 to about 4.

7. The polyethylene polymer blend of claim 1 wherein the melt index ($I_2$) of the HDPE is from about 0.5 to about 2 g/10 min and the melt flow ratio ($I_{10}/I_2$) of the HDPE is from about 6 to about 8.

8. The polyethylene polymer blend of claim 1 wherein the density of the LDPE is from about 0.915 to about 0.930 g/cm³, and the MWD of the LDPE is from about 4 to about 10.

9. The polyethylene polymer blend of claim 1 wherein the melt index ($I_2$) of the LDPE is from about 0.5 to about 7 g/10 min.

10. An article comprising a polyethylene polymer blend, wherein the polyethylene blend has a melt index ($I_2$)<2 g/10 min, wherein $I_2$ is measured according to ASTM D1238 at 190° C. and 2.16 kg load, wherein the polyethylene polymer blend comprises:
   at least about 50% by wt. of at least one high density polyethylene resin (HDPE) having
      a density ≥0.950 g/cm³, when measured according to ASTM D792;

a melt index ($I_2$)<4 g/10 min;

a melt flow ratio ($I_{10}/I_2$)≤9, where $I_{10}$ is measured according to ASTM D1238 at 190° C. and 10 kg load; and a molecular weight distribution (MWD) of about 2.0 to about 5, wherein MWD is defined as Mw/Mn with Mw being a weight average molecular weight and Mn being a number average molecular weight; and about 1% to about 20% by wt. of at least one low density polyethylene resin (LDPE) having a density ≤0.930 g/cm³, a melt index ($I_2$) of about 0.1 to about 10 g/min, and a MWD>3, and wherein the article has a haze value ≤30% when measured according to ASTM-D-1003.

11. The article of claim 10 wherein the article has a 2% secant modulus greater than 90,000 psi in the machine direction in accordance with ASTM D882-12.

12. The article of claim 10 wherein the article has an MD tear of less than 35 g in the machine direction in accordance with ASTM D882-12.

13. The article of claim 10 wherein the article is a blown monolayer film having a thickness of about 0.5 to about 1.5 mils and the haze value ≤25%.

14. The article of claim 13 wherein the haze value ≤20%.

15. The article of claim 10 wherein the polyethylene polymer blend comprises about 2% to about 15% by wt. LDPE, and about 60% to about 98% by wt. HDPE.

16. The article of claim 10 wherein the density of the polyethylene polymer blend ≥0.950 g/cm³, the melt flow ratio ($I_{10}/I_2$) of the polyethylene polymer blend ≤9, and the melt index ($I_2$) is from about 0.5 to about 1.5 g/10 min.

17. The article of claim 10 wherein the density of the HDPE is from about 0.955 to about 0.970 g/cm³ and the MWD of the HDPE is from about 2.5 to about 4.

18. The article of claim 10 wherein the melt index ($I_2$) of the HDPE is from about 0.5 to about 2 g/10 min and the melt flow ratio ($I_{10}/I_2$) of the HDPE is from about 6 to about 8.

19. The article of claim 10 wherein the density of the LDPE is from about 0.915 to about 0.930 g/cm³, the MWD of the LDPE is from about 4 to about 10, and the melt index ($I_2$) of the LDPE is from about 0.5 to about 7 g/10 min.

* * * * *